United States Patent
Iwata et al.

(10) Patent No.: US 10,464,752 B2
(45) Date of Patent: Nov. 5, 2019

(54) CONVEYANCE FACILITY

(71) Applicant: DAIFUKU CO., LTD., Osaka-shi, Osaka (JP)

(72) Inventors: Masashige Iwata, Shiga (JP); Hiromichi Ikeuchi, Shiga (JP)

(73) Assignee: DAIFUKU CO., LTD., Osaka (JP)

( * ) Notice: Subject to any disclaimer, the term of this patent is extended or adjusted under 35 U.S.C. 154(b) by 0 days.

(21) Appl. No.: 16/268,883

(22) Filed: Feb. 6, 2019

(65) Prior Publication Data
US 2019/0248583 A1 Aug. 15, 2019

(30) Foreign Application Priority Data

Feb. 9, 2018 (JP) ................................ 2018-021487

(51) Int. Cl.
| | | |
|---|---|---|
| *B65G 9/00* | (2006.01) | |
| *B65B 35/16* | (2006.01) | |
| *B65G 19/02* | (2006.01) | |
| *B65G 17/08* | (2006.01) | |
| *B65G 17/20* | (2006.01) | |

(52) U.S. Cl.
CPC .............. *B65G 9/002* (2013.01); *B65B 35/16* (2013.01); *B65G 9/008* (2013.01); *B65G 17/086* (2013.01); *B65G 19/025* (2013.01); *B65G 2201/0238* (2013.01)

(58) Field of Classification Search
CPC ...... B65G 9/002; B65G 9/008; B65G 17/086; B65G 19/025; B65B 35/16
USPC ............................ 198/466.1, 678.1, 680, 681
See application file for complete search history.

(56) References Cited

U.S. PATENT DOCUMENTS

| | | | | |
|---|---|---|---|---|
| 3,009,424 A | * | 11/1961 | Chill | ......................... B23Q 7/06 104/162 |
| 4,942,956 A | * | 7/1990 | Acker | ..................... B65G 47/61 104/162 |
| 5,111,750 A | * | 5/1992 | Nozaki | .................. B65G 37/02 104/172.4 |
| 5,404,992 A | * | 4/1995 | Robu | .................... B65G 19/025 198/465.4 |

(Continued)

FOREIGN PATENT DOCUMENTS

| | | |
|---|---|---|
| DE | 29511555 U1 | 10/1995 |
| DE | 29709547 U1 | 8/1997 |

(Continued)

OTHER PUBLICATIONS

Extended European Search Report from corresponding EP 19155856.8, dated Jul. 5, 2019.

*Primary Examiner* — Douglas A Hess
(74) *Attorney, Agent, or Firm* — Kusner & Jaffe

(57) ABSTRACT

A conveyance facility for conveying a bag includes a carrier including a support supporting the bag, and traveling wheels. A conveyance path includes a straight section and a curve section. In the curve section, a pulley rotatable along the curve section and in frictional contact with the support; and a guide rail guiding the traveling wheels are provided. The guide rail includes a rotation guide rail guiding one traveling wheel of a pair of the traveling wheels, and rotating with the pulley; a fixed guide rail guiding another traveling wheel of the pair of traveling wheels, and being provided along the rotation guide rail; and an upper guide rail and a side guide rail guiding the support.

5 Claims, 12 Drawing Sheets

(56) References Cited

U.S. PATENT DOCUMENTS

| | | | | |
|---|---|---|---|---|
| 5,450,942 A | * | 9/1995 | Johann | B61B 10/025 104/172.4 |
| 5,697,301 A | * | 12/1997 | Sporer | B65G 19/025 104/163 |
| 5,718,320 A | * | 2/1998 | Marquier | B62D 65/18 198/345.3 |
| 5,857,556 A | * | 1/1999 | Bonacorsi | B65G 17/20 198/683 |
| 6,341,686 B1 | * | 1/2002 | Beyer | B65G 19/025 198/465.4 |
| 6,588,579 B2 | * | 7/2003 | Taeger | B65G 17/20 104/172.1 |
| 6,786,323 B2 | * | 9/2004 | Schonenberger | B65G 19/025 198/678.1 |
| 6,991,090 B2 | * | 1/2006 | Gaertner | B65G 19/025 198/465.4 |
| 7,137,769 B2 | * | 11/2006 | Komatsu | B65G 35/06 414/222.01 |
| 9,027,740 B2 | * | 5/2015 | Boehrer | B65G 17/20 198/678.1 |
| 10,011,425 B2 | * | 7/2018 | Otto | B65G 9/006 |
| 10,023,386 B2 | * | 7/2018 | Otto | B65G 9/008 |
| 2004/0045793 A1 | | 3/2004 | Schonenberger | |
| 2004/0107862 A1 | | 6/2004 | Suh | |

FOREIGN PATENT DOCUMENTS

| | | |
|---|---|---|
| DE | 19943141 A1 | 3/2001 |
| EP | 1448465 B1 | 3/2007 |
| WO | WO 01/68482 A2 | 9/2001 |
| WO | WO 03/037760 A1 | 5/2003 |

\* cited by examiner

F I G. 4
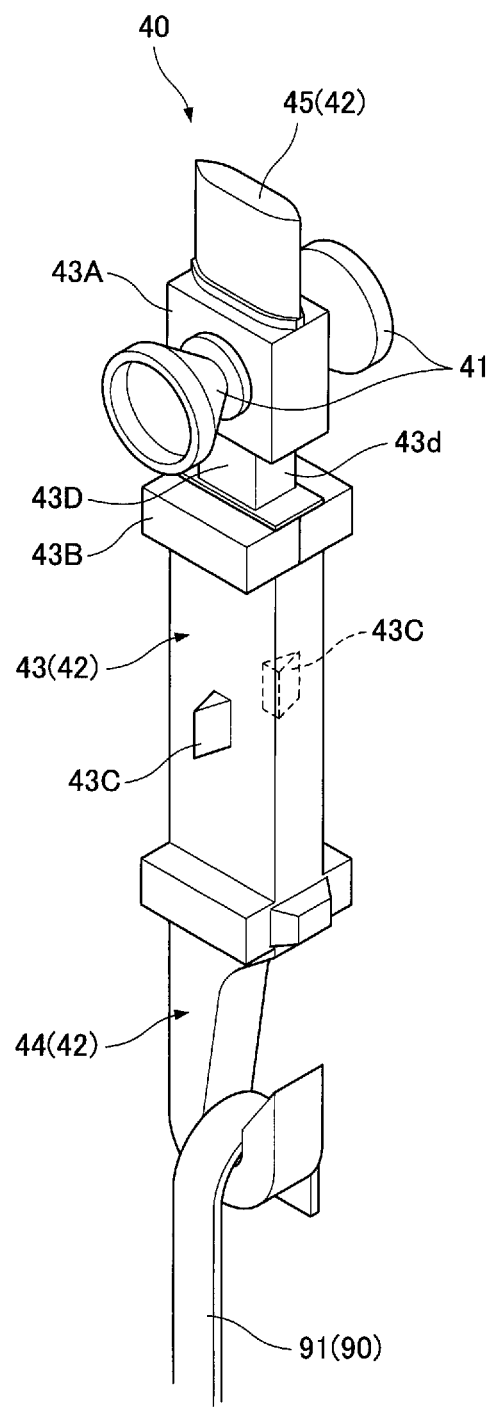

F I G. 11B
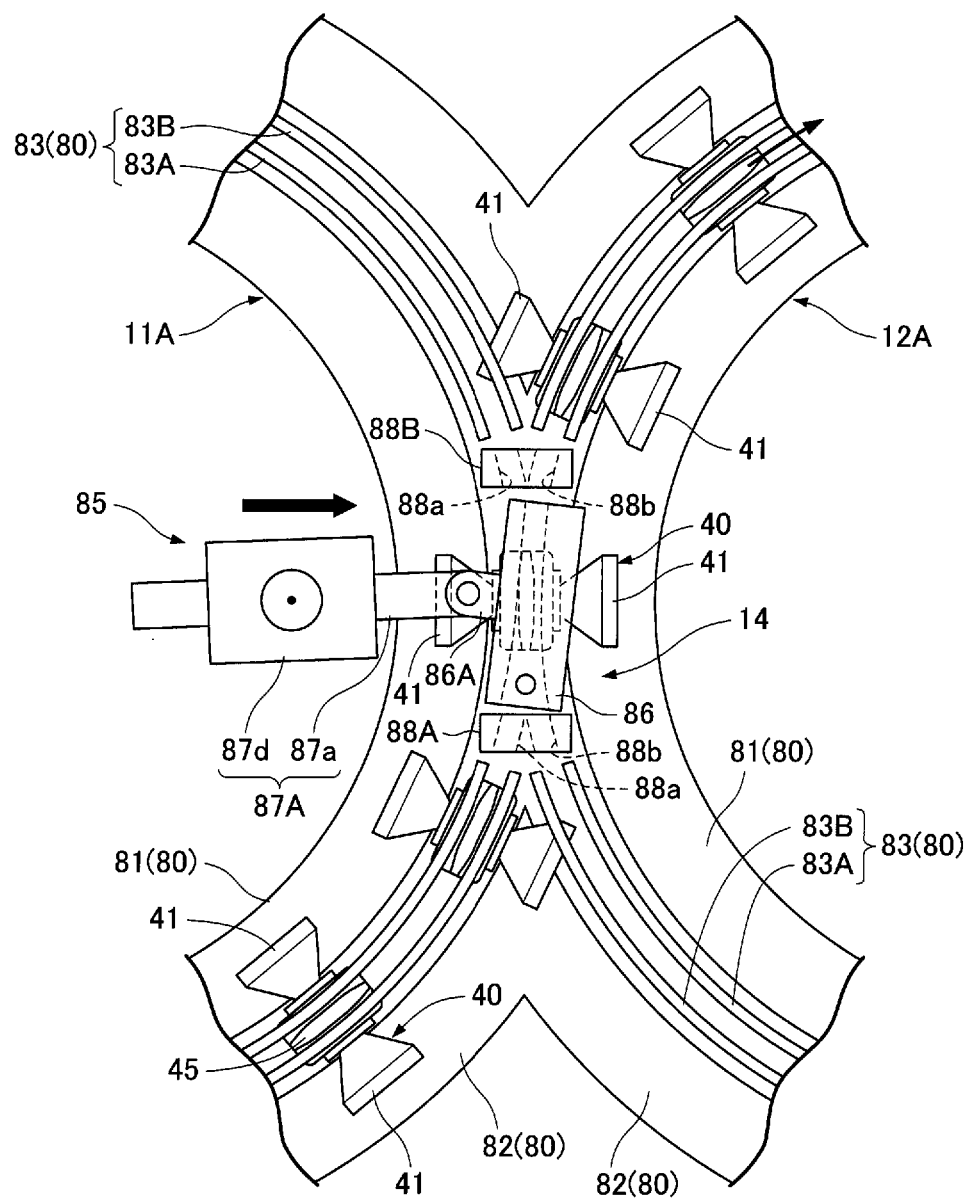

CONVEYANCE FACILITY

FIELD OF THE INVENTION

The present invention relates to a conveyance facility for conveying articles along a conveyance path, in particular to a conveyance facility for suspended conveyance of the articles.

BACKGROUND OF THE INVENTION

A conventional conveyance facility for suspended conveyance of articles is shown in WO01/068482. The conveyance facility shown in WO01/068482 is a suspended conveyor device including a first conveyor path, a second conveyor path, and traveling rails constituting the first conveyor path and the second conveyor path. The suspended conveyor device guides supports for goods to be conveyed, on the traveling rails. The suspended conveyor device includes a re-routing station for selectively re-routing the supports from the first (second) conveyor path to the second (first) conveyor path, or leaving the supports on the first (second) conveyor path.

The suspended conveyor device shown in WO01/068482 includes deflection drums and a conveyance circulation path like an elongated conveyor loop. The conveyance circulation path includes the traveling rails in a linear path region between the deflection drums. Each of the deflection drums has conveyor flanges. The deflection drum causes each of the conveyor flanges to engage with a groove formed on each of the supports, and thereby inherits the support traveling on the traveling rails for conveyance. A traveling direction of the support inherited by the deflection drum is changed according to rotation of the deflection drum.

In the conveyance facility shown in WO01/068482, however, the engagement of the support with the conveyor flange of the deflection drum is required to cause the deflection drum (rotating body) to inherit the support (conveyance unit) traveling on the traveling rails. Accordingly, the support itself needs to separately include an engaging portion (groove) for the conveyor flange of the deflection drum. Unfortunately, the support thus has a complex configuration.

The support itself needs to be synchronized to the rotation of the deflection drum for the engagement of the engaging portion (groove) of the support with the conveyor flange of the deflection drum. Unfortunately, conveyance control of the support thus becomes complex. In addition, strict adjustment of an installation height of the deflection drum is required in accordance with positions of the traveling rails (a height of the conveyed support). Such strict adjustment causes difficult installation of the deflection drum.

Unfortunately, in the inheritance (transfer) of the support traveling on the traveling rails by the deflection drum (rotating body), the engaging portion (groove) of the support is caused to engage with the conveyor flange of the deflection drum. The engagement thus generates friction between the engaging portion (groove) of the support and the conveyor flange (deflection drum), in the transfer of the conveyance unit to the deflection drum.

SUMMARY OF THE INVENTION

An object of the present invention is to provide a conveyance facility capable of simplifying the configuration of the conveyance unit, the control of the conveyance with the conveyance unit, and the installation of the rotating body, and also capable of preventing the generation of the friction between the support of the conveyance unit and the rotating body.

Problems to be solved by the present invention have been described. Solutions to the problems will be described next.

A conveyance facility of the present invention is a conveyance facility for conveying an article along a conveyance path, including: a conveyance unit including a pair of traveling bodies traveling on the conveyance path, and a support traveling with the pair of traveling bodies and supporting the article being suspended, the conveyance unit conveying the article along the conveyance path, wherein the conveyance path includes a straight section, and a curve section extended from the straight section, wherein the curve section includes: a rotating body rotatable along the curve section and in frictional contact with the support; a traveling-body guide rail guiding the pair of traveling bodies so as to be travelable along the curve section; and a support guide rail guiding the support along the curve section, and wherein the traveling-body guide rail includes: a rotation guide rail guiding one traveling body of the pair of traveling bodies, and rotating with the rotating body; and a fixed guide rail guiding another traveling body of the pair of traveling bodies, and being provided along the rotation guide rail.

In the aforementioned configuration, the support of the conveyance unit traveling on the curve section is guided by the support guide rail. In the aforementioned configuration, one traveling body of the pair of traveling bodies is guided by the rotation guide rail, and the other traveling body of the pair of traveling bodies is guided by the fixed guide rail.

Furthermore, the support guide rail includes an upper guide rail guiding a head portion of the support; and a side guide rail guiding a body portion of the support.

In the aforementioned configuration, the head portion of the support of the conveyance unit traveling on the curve section is guided by the upper guide rail. In the aforementioned configuration, the body portion of the support of the conveyance unit traveling on the curve section is guided by the side guide rail.

Furthermore, the rotating body includes a meshing contact portion being meshed with the support.

In the aforementioned configuration, the rotating body meshed with the support rotates along the curve section.

Furthermore, the rotating body includes a frictional contact portion coming into frictional contact with the support; and a meshing contact portion being meshed with the support, and the meshing contact portion is provided lower than a position where the frictional contact portion is provided in the rotating body.

In the aforementioned configuration, meshed contact with the support is performed lower than the frictional contact with the support.

Furthermore, the conveyance path includes a first conveyance path including the curve section, and a second conveyance path provided independently from the first conveyance path and including the curve section; the conveyance facility includes a switching device capable of switching the conveyance path of the conveyance unit traveling on the curve section of the first conveyance path, to the curve section of the second conveyance path, and capable of switching the conveyance path of the conveyance unit traveling on the curve section of the second conveyance path, to the curve section of the first conveyance path; and when the switching device switches the conveyance path of the conveyance unit, the switching device switches the guide for the traveling body guided by the rotation guide rail, to the guide by the fixed guide rail, and switches the guide for the traveling body guided by the fixed guide rail, to the guide by the rotation guide rail.

In the aforementioned configuration, the guide for the traveling body guided by the rotation guide rail is switched to the guide by the fixed guide rail. The guide for the traveling body guided by the fixed guide rail is switched to the guide by the rotation guide rail. The conveyance path of the conveyance unit is thereby switched.

According to the conveyance facility of the present invention, the conveyance unit is caused to travel on the curve section with both traveling bodies being guided by the guide rail. The conveyance unit thus does not need to separately include the engaging portion for the rotating body. The configuration of the conveyance unit can thus be simplified.

When the conveyance unit transfers a traveling section from the straight section to the curve section of the conveyance path, the conveyance unit itself does not need to be synchronized to the rotation of the rotating body. The conveyance of the conveyance unit can thus be easily controlled. In addition, the strict adjustment of the installation height of the rotating body is not required in accordance with the height of the conveyed support. The installation of the rotating body can thus be simplified.

When the conveyance unit transfers the traveling section from the straight section to the curve section of the conveyance path, the support of the conveyance unit does not engage (mate) with the rotating body itself. The generation of the friction between the support and the rotating body can thus be prevented.

BRIEF DESCRIPTION OF THE DRAWINGS

FIG. 4 is a perspective view of a carrier of the same conveyance facility;

FIG. 11B is a plan view showing the operations of the cross branch switch according to the other example of the same conveyance facility in a case where the conveyance path of the carrier is changed from the first circulation path to a second circulation path.

DESCRIPTION OF THE INVENTION

A conveyance facility 10 according to the present invention will be described. The present invention is not limited to the conveyance facility 10 to be shown below.

Figure 1:
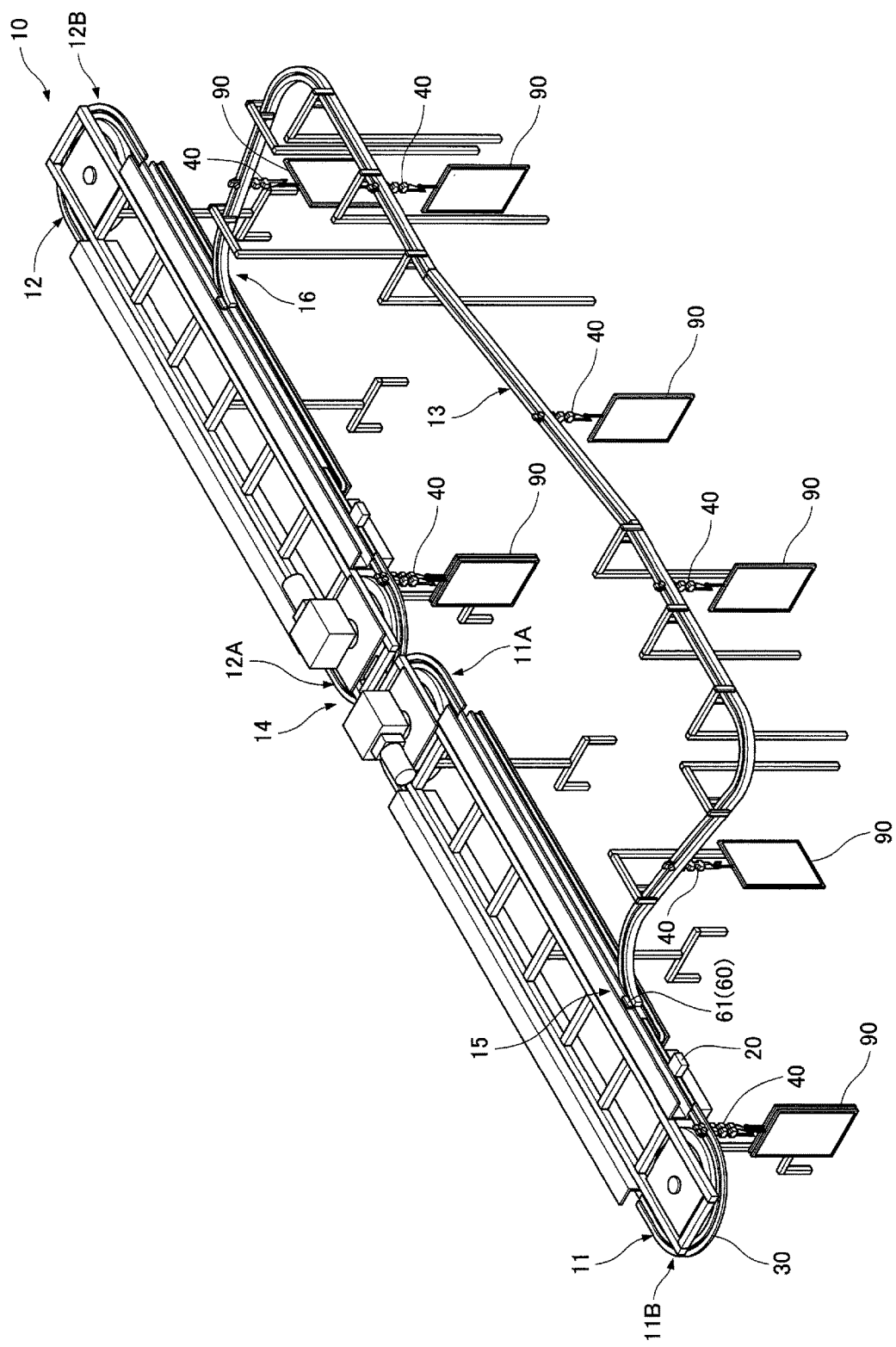
FIG. 1 is a general perspective view of a conveyance facility according to the present invention.

As shown in FIG. 1, the conveyance facility 10 is a suspended conveyance facility for suspended conveyance of bags 90 (an example of "article") containing goods. The conveyance facility 10 includes a first path 11 (an example of "conveyance path" and "first conveyance path") and a second path 12 (an example of "conveyance path" and "second conveyance path") for circularly conveying the bags 90, as well as a detour path 13 (an example of "conveyance path") branching from a location in the middle of the first path 11 and joining the second path 12.

The first path 11 and the second path 12 include loop-like conveyance paths. The first path 11 and the second path 12 have swivel paths 11A, 11B, 12A, and 12B (an example of "curve section") on both end portions, respectively. The first path 11 and the second path 12 are serially arranged so that the swivel path 11A and the swivel path 12A on the respective ones of the end portions face each other. A branch portion 14 is provided at a joint section between the first path 11 and the second path 12 (a portion where the swivel path 11A and the swivel path 12A face each other).

The branch portion 14 keeps the bags 90 being circularly conveyed on the first path 11 so as to be circularly conveyed on the first path 11. Alternatively, the branch portion 14 causes the bags 90 being circularly conveyed on the first path 11 to be conveyed on the second path 12 through intersection of the branch portion 14. The branch portion 14 keeps the bags 90 being circularly conveyed on the second path 12 so as to be circularly conveyed on the second path 12. Alternatively, the branch portion 14 causes the bags 90 being circularly conveyed on the second path 12 to be conveyed on the first path 11 through the intersection of the branch portion 14. The swivel paths 11A and 12A, and the branch portion 14 will be described later.

The detour path 13 is a conveyance path for causing the bags 90 conveyed on the first path 11 to detour without the branch portion 14 so as to join the second path 12. A beginning portion of the detour path 13 branches at a location in the middle of the first path 11. An ending portion of the detour path 13 joins the second path 12.

A branch portion 15 is provided at the beginning portion of the detour path 13 (a connecting portion between the detour path 13 and the first path 11). The branch portion 15 is a portion where the detour path 13 branches from a location in the middle of the first path 11. The branch portion 15 keeps the bags 90 conveyed on the first path 11 so as to be conveyed on the first path 11. Alternatively, the branch portion 15 causes some of the bags 90 conveyed on the first path 11 to branch from the first path 11 to the detour path 13 for conveyance.

A joint portion 16 is provided at the ending portion of the detour path 13 (a connecting portion between the detour path 13 and the second path 12). The joint portion 16 is a portion where the detour path 13 joins the second path 12. The joint portion 16 keeps the bags 90 conveyed on the second path 12 so as to be conveyed on the second path 12. Alternatively, the joint portion 16 causes the bags 90 conveyed on the detour path 13 to join the second path 12.

Figure 2A:
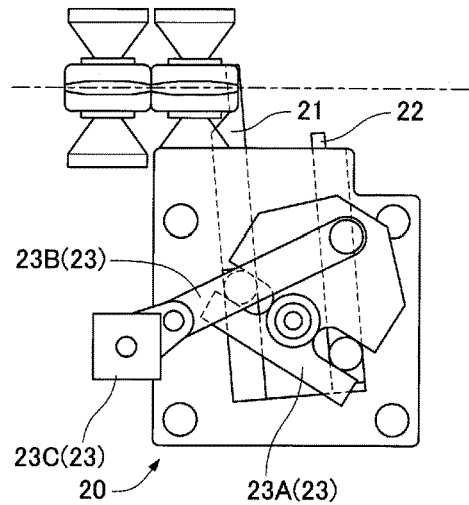
FIG. 2A is a plan view showing an outline of operations of first and second sending devices of the same conveyance facility in a case where a first stopper is moved forward.
Figure 2B:
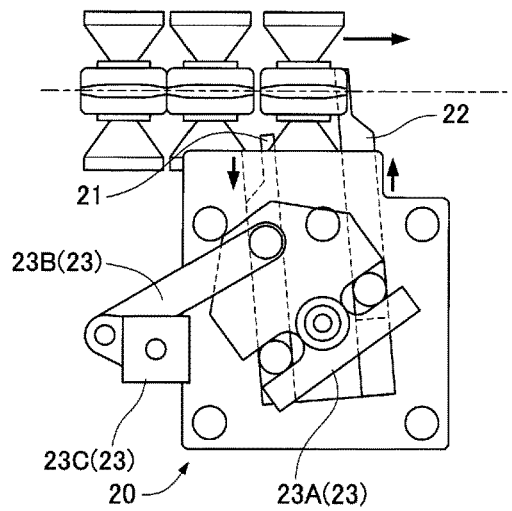
FIG. 2B is a plan view showing the outline of the operations of the first and second sending devices of the same conveyance facility in a case where the first stopper is moved backward and a second stopper is moved forward.
Figure 2C:
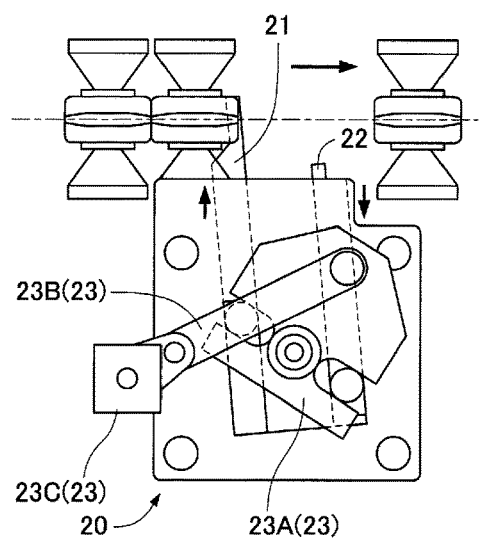
FIG. 2C is a plan view showing the outline of the operations of the first and second sending devices of the same conveyance facility in a case where the second stopper is moved backward and the first stopper is moved forward.

On the first path 11, a first sending device 20 is provided on an upstream side of the branch portion 15. The first sending device 20 is a device for sending out multiple carriers 40 (an example of "conveyance unit") traveling with the bags 90 being suspended, at predetermined intervals. The first sending device 20 causes the multiple carriers 40 continuously traveling toward the branch portion 15 to stop once, and causes the adjacent carriers 40 to sequentially travel at the predetermined intervals. As shown in FIGS. 2A to 2C, the first sending device 20 includes a first stopper 21 and a second stopper 22 for stopping the carriers 40, and a cam mechanism 23 for moving the first stopper 21 and the second stopper 22.

The first stopper 21 and the second stopper 22 are lengthy members extended orthogonally to a horizontal direction, with respect to a traveling direction of the carriers 40 traveling in the horizontal direction. The first stopper 21 and the second stopper 22 are driven by the cam mechanism 23 so as to move outward and backward with respect to the horizontal direction. Tip end portions of the first stopper 21 and the second stopper 22 move forward with respect to the horizontal direction so as to abut a front surface of each of the carriers 40 in the traveling direction to stop the carrier 40. The tip end portions of the first stopper 21 and the second stopper 22 move backward with respect to the horizontal direction so as to cancel the stop of the carrier 40 caused by the tip end portions. The first stopper 21 is arranged closer to an upstream side of the first sending device 20 than the second stopper 22.

The cam mechanism 23 includes a cam body 23A causing the first stopper 21 and the second stopper 22 to alternately move outward and backward, an arm 23B swinging the cam body 23A, and a drive motor 23C driving the arm 23B. The cam mechanism 23 drives the drive motor 23C to operate the arm 23B so as to swing the cam body 23A. The first stopper 21 and the second stopper 22 thereby alternately move outward and backward with respect to the horizontal direction.

The first sending device 20 causes the first stopper 21 and the second stopper 22 to alternately move outward and backward, and shifts timings of the carriers 40 passing through the first sending device 20, so as to have the predetermined intervals between the adjacent carriers 40. Specifically, as shown in FIG. 2A, the tip end portion of the first stopper 21 abuts the front surface of the carrier 40 traveling from the upstream side of the first sending device 20, in the traveling direction. The carrier 40 traveling from the upstream side of the first sending device 20 is thereby stopped by the first stopper 21. As shown in FIG. 2B, the cam mechanism 23 is driven to cause the first stopper 21 to move backward and also cause the second stopper 22 to move forward. The carrier 40 stopped by the first stopper 21 thereby travels to a downstream side, and is stopped again by the second stopper 22. As shown in FIG. 2C, at a timing of a subsequent carrier 40 arriving at the first stopper 21, the cam mechanism 23 is driven to cause the first stopper 21 to move forward and also cause the second stopper 22 to move backward. The carrier 40 stopped by the second stopper 22 thereby travels to the downstream side, and the subsequent carrier 40 is stopped by the first stopper 21. In this way, the alternate movement of the first stopper 21 and the second stopper 22 causes only one carrier 40 to pass between the first stopper 21 and the second stopper 22. The adjacent carriers 40 (bags 90) thereby travel at the predetermined intervals.

As shown in FIG. 1, a branch unit 60 is provided at the branch portion 15 of the first path 11. The branch unit 60 is a device for switching the conveyance path of the bags 90 conveyed on the first path 11, to the detour path 13. The branch unit 60 includes a branch device 61 for switching the conveyance path of the carriers 40. The branch unit 60 actuates the branch device 61 to direct the carriers 40 traveling on the first path 11, to the detour path 13. The conveyance path of the bags 90 (carriers 40) conveyed from the first path 11 is thereby switched to the detour path 13.

Figure 3:
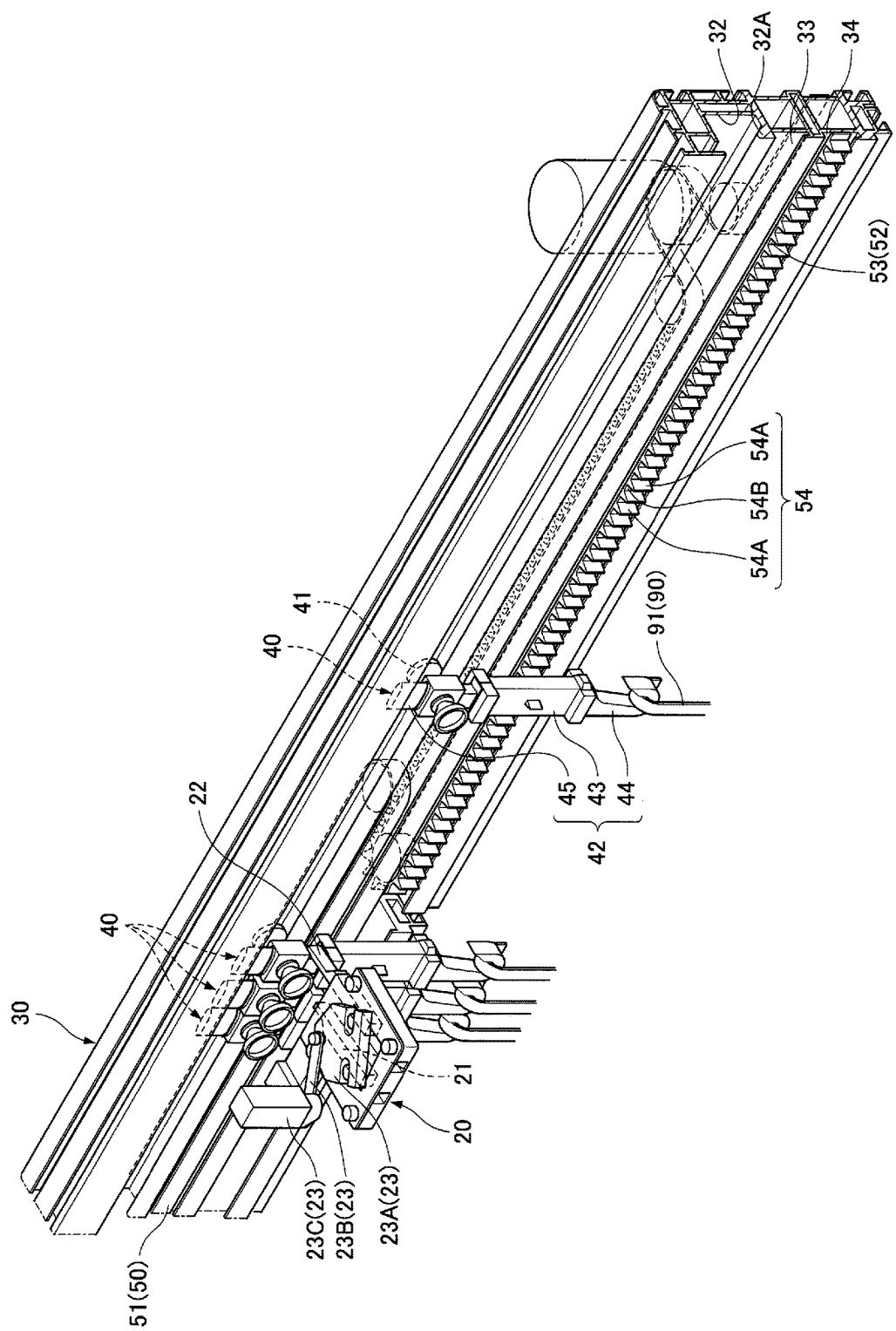
FIG. 3 is a perspective view of a traveling rail of the same conveyance facility.

As shown in FIGS. 1, 3 and 4, the conveyance facility 10 includes traveling rails 30 formed along the respective conveyance paths (the first path 11, the second path 12, and the detour path 13), and the carriers 40 being supported so as to be travelable by the traveling rails 30 and supporting the bags 90 being suspended.

Each of the traveling rails 30 is a frame material formed with an upper portion projecting more than a lower portion in the horizontal direction. The frame material is substantially reverse L-shaped as viewed from the side. The traveling rails 30 are extended along the respective conveyance paths (the first path 11, the second path 12, and the detour path 13). The traveling rail 30 supports a traveling wheel 41 of the carrier 40 so as to be travelable, as will be described. In the traveling rail 30, a guide groove 31 guiding an upper portion of the carrier 40, a wheel support groove 32 supporting the traveling wheel 41 of the carrier 40 so as to be travelable, an upper belt groove 33 supporting an accumulation belt 50, and a lower belt groove 34 supporting a tracking conveyance belt 52 are extended in a longitudinal direction. The traveling rail 30 is formed with the guide groove 31, the wheel support groove 32, the upper belt groove 33, and the lower belt groove 34, in order from the upper portion of the frame material. According to such a configuration of the traveling rail 30, the tracking conveyance belt 52 is arranged lower than the accumulation belt 50 in the traveling rail 30. Also, the accumulation belt 50 is arranged on the side of the traveling wheel 41 of the carrier 40 supported by the traveling rail 30.

The guide groove 31 is a groove-like portion (concave portion) formed at the upper portion (portion projecting in the horizontal direction) of the traveling rail 30. The groove-like portion opens in a vertical direction. The guide groove 31 is formed at the upper portion of the traveling rail 30 so as to cover the upper portion of the traveling carrier 40. The guide groove 31 holds an upper side surface of the carrier 40 in the groove-like portion, and guides the upper portion of the carrier 40 along the respective conveyance paths (the first path 11, the second path 12, and the detour path 13).

The wheel support groove 32 is a groove-like portion (concave portion) formed at an upper side surface of the traveling rail 30. The groove-like portion opens in the horizontal direction. The wheel support groove 32 can cause the traveling wheel 41 of the carrier 40 to travel. A lower edge portion 32A of the groove-like portion of the wheel support groove 32 is formed in accordance with the shape of the traveling wheel 41. The wheel support groove 32 supports the traveling wheel 41 so as to be travelable, at the edge portion 32A.

The upper belt groove 33 is a groove-like portion (concave portion) formed at a central side surface of the traveling rail 30. The groove-like portion opens in the horizontal direction. The accumulation belt 50 can stand in the vertical direction so as to fit the upper belt groove 33. The upper belt groove 33 can cause the circular accumulation belt 50 to circle along a side surface of the traveling rail 30. The upper belt groove 33 slidably supports the accumulation belt 50 along the side surface of the traveling rail 30.

The lower belt groove 34 is a groove-like portion (concave portion) formed at a lower side surface of the traveling rail 30. The groove-like portion opens in the horizontal direction. The tracking conveyance belt 52 can stand in the vertical direction so as to fit the lower belt groove 34. The lower belt groove 34 can cause the circular tracking conveyance belt 52 to circle along the side surface of the traveling rail 30. The lower belt groove 34 slidably supports the tracking conveyance belt 52 along the side surface of the traveling rail 30.

Figure 5:
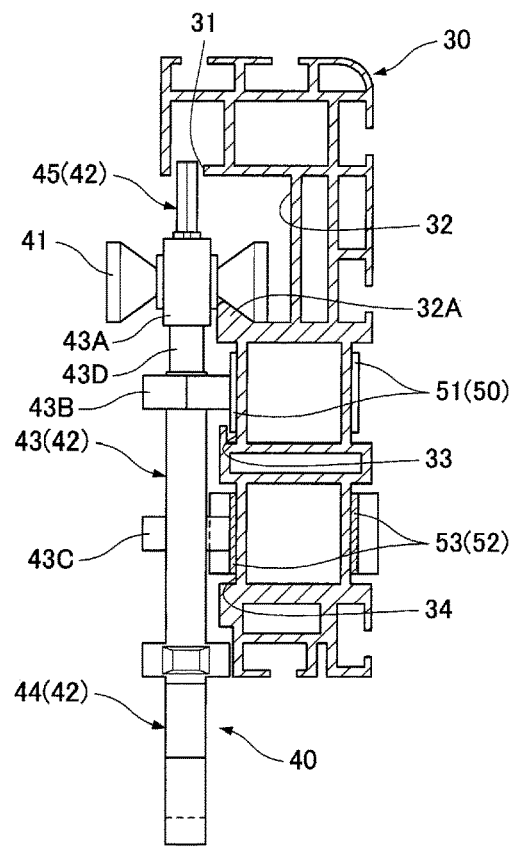
FIG. 5 is a cross-sectional view of the traveling rail of the same conveyance facility.

As shown in FIGS. 3 to 5, the carrier 40 includes the traveling wheel 41 (an example of "traveling body") supported so as to be travelable with respect to the traveling rail 30, and a support 42 supporting the bag 90 being suspended.

The traveling wheel 41 includes a pair of substantially cone-shaped wheels. The traveling wheel 41 is turnably supported by an upper portion of the support 42. In the traveling wheel 41, one wheel of the pair of wheels is placed in the wheel support groove 32 of the traveling rail 30, and is supported so as to be travelable.

The support 42 mainly includes a body portion 43 as a main body portion of the support 42, a suspension portion 44 provided at a lower portion of the body portion 43 so as to support the bag 90 being suspended, and a head portion 45 provided at an upper portion of the body portion 43 so as to be guided by the traveling rail 30.

As shown in FIGS. 4 and 5, the body portion 43 is composed of a lengthy plate-like member. In the body portion 43, a wheel support portion 43A turnably supporting the traveling wheel 41, a contact portion 43B coming into contact with the accumulation belt 50, a meshing portion 43C being meshed with the tracking conveyance belt 52, and an engaging portion 43D engaging with the first stopper 21 and the second stopper 22 of the first sending device 20 are formed.

The wheel support portion 43A is formed at the upper portion of the body portion 43. In the wheel support portion 43A, a turning shaft of the traveling wheel 41 is provided orthogonally to the horizontal direction, with respect to the traveling direction of the carrier 40 traveling in the horizontal direction.

The contact portion 43B is a block-like portion formed so as to project in the horizontal direction from both side surfaces of an upper central portion of the body portion 43. A tip end side surface of the contact portion 43B contacts with the accumulation belt 50. The contact portion 43B is formed with materials capable of friction transmission by the accumulation belt 50 (for example, rubber or the like).

Figure 6:
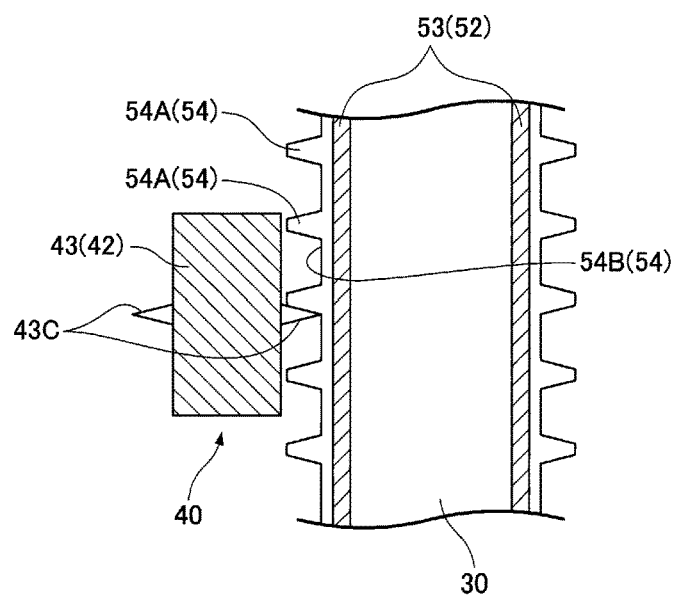
FIG. 6 is a schematic plan and cross-sectional view showing the carrier and a tracking conveyance belt of the same conveyance facility when the carrier is meshed with the tracking conveyance belt.

The meshing portion 43C is a flat plate-like convex member formed so as to project in the horizontal direction from both side surfaces of a central portion of the body portion 43. A tip end portion of the meshing portion 43C is meshed with the tracking conveyance belt 52. As shown in FIG. 6, in the meshing portion 43C, the tip end portion of the convex member is formed to be narrower than a base end portion of the convex member. The tip end portion of the convex member is also formed to be narrower than an interval between two adjacent peak portions 54A (a width of a valley portion 54B) of a concave portion 54 of the tracking conveyance belt 52, as will be described below. With this formation of the meshing portion 43C, in the meshing with the tracking conveyance belt 52, the tip end portion of the meshing portion 43C in contact with the peak portion 54A of the concave portion 54 may easily drop on the side of the valley portion 54B. Accordingly, the convex member of the meshing portion 43C may easily come into meshed contact with the valley portion 54B of the concave portion 54.

As shown in FIG. 4, the engaging portion 43D is a portion formed at an upper portion side of the body portion 43, and between the wheel support portion 43A and the contact portion 43B. In the engaging portion 43D, a notch portion 43d is formed at a side portion in the traveling direction of the carrier 40. The length of the carrier 40 in the traveling direction is thereby formed to be shorter than other portions (for example, the wheel support portion 43A). The engaging portion 43D engages with the first stopper 21 and the second stopper 22 of the first sending device 20 at the notch portion 43d.

As shown in FIGS. 3 and 4, the suspension portion 44 is a hook-like portion extended from the lower portion of the body portion 43. The suspension portion 44 can hook and support a hook portion 91 formed at an upper portion of the bag 90.

The head portion 45 is a flat plate-like portion extended from the upper portion of the body portion 43. The head portion 45 is guided by the guide groove 31 of the traveling rail 30. The head portion 45 is formed so that a thickness in a direction orthogonal to the horizontal direction, with respect to the traveling direction of the carrier 40 traveling in the horizontal direction, is thinner than the body portion 43. A tip end portion of the head portion 45 is inserted into the guide groove 31. Both side surfaces of the head portion 45 are then held and guided by the guide groove 31.

As shown in FIGS. 3 and 5, the carrier 40 travels on the traveling rail 30 through either frictional contact with the accumulation belt 50 (the friction transmission by the accumulation belt 50), or the meshed contact with the tracking conveyance belt 52 (meshing transmission by the tracking conveyance belt 52).

The accumulation belt 50 is a circular friction transmission belt for causing the carrier 40 to travel through the friction transmission. The accumulation belt 50 is slidably provided in the upper belt groove 33 of the traveling rail 30, along the circumference of the traveling rail 30. In the accumulation belt 50, a belt 51 is formed to be flat and contactable with a side surface of the contact portion 43B of the body portion 43 of the carrier 40. The accumulation belt 50 puts the belt 51 into contact with the contact portion 43B of the carrier 40. The belt 51 in contact with the contact portion 43B is caused to slide along the upper belt groove 33 of the traveling rail 30. The carrier 40 (traveling wheel 41) is thereby caused to travel.

The tracking conveyance belt 52 is a circular meshing transmission belt for causing the carrier 40 to travel through the meshing transmission. The tracking conveyance belt 52 is slidably provided in the lower belt groove 34 of the traveling rail 30, along the circumference of the traveling rail 30. The tracking conveyance belt 52 causes the meshing portion 43C of the body portion 43 of the carrier 40 to be meshed with a belt 53. The belt 53 meshed with the meshing portion 43C is caused to slide along the lower belt groove 34 of the traveling rail 30. The carrier 40 (traveling wheel 41)

is thereby caused to travel. In the tracking conveyance belt 52, a plurality of the concave portions 54 are formed on the belt 53 so as to be meshed with the meshing portion 43C of the carrier 40. As shown in FIGS. 3 and 6, the concave portion 54 consists of the two peak portions 54A, and the valley portion 54B linking the adjacent peak portions 54A together. For the concave portions 54, the peak portions 54A and the valley portions 54B are alternately and continuously formed along a moving direction (sliding direction) of the tracking conveyance belt 52. The meshing portion 43C of the body portion 43 of the carrier 40 is meshed between the two peak portions 54A (with the valley portion 54B) of the concave portion 54. The tracking conveyance belt 52 is thereby put into meshed contact with the carrier 40. In other words, the meshing portion 43C of one carrier 40 is meshed with one concave portion. Thereby, the carrier 40 becomes held by the tracking conveyance belt 52. When the belt 53 slides, movement of the carrier 40 is controlled by the interval between the two peak portions 54A (the width of the valley portion 54B) of the concave portion 54.

The accumulation belt 50 and the tracking conveyance belt 52 are arranged at different positions of the traveling rail 30. Specifically, on the horizontally arranged traveling rail 30, the tracking conveyance belt 52 is arranged at a position (the lower belt groove 34) lower than a position (the upper belt groove 33) where the accumulation belt 50 is arranged. In other words, the accumulation belt 50 is arranged so as to be frictionally contactable with the carrier 40 on a side near the traveling wheel 41 (at the contact portion 43B) in the body portion 43 of the carrier 40. The tracking conveyance belt 52 is arranged to be able to be meshed with the carrier 40 on a side far from the traveling wheel 41 (at the meshing portion 43C) in the body portion 43 of the carrier 40. In such arrangements, for the frictional contact of the carrier 40 with the accumulation belt 50, the side (contact portion 43B) near the traveling wheel 41 in the carrier 40 contacts with the accumulation belt 50. For the meshing between the carrier 40 and the tracking conveyance belt 52, the side (meshing portion 43C) far from the traveling wheel 41 in the carrier 40 contacts with the tracking conveyance belt 52. Accordingly, the carrier 40 can travel at a stable position without jounce in conveyance in contact with the respective belts.

As shown in FIG. 3, the accumulation belt 50 and the tracking conveyance belt 52 are arranged at different positions from a boundary at the first sending device 20 arranged on the upstream side of the branch portion 15 of the first path 11. Specifically, the accumulation belt 50 is arranged on the upstream side from a position where the first sending device 20 is arranged. The tracking conveyance belt 52 is arranged on the downstream side from the position where the first sending device 20 is arranged. In other words, the friction transmission by the accumulation belt 50 causes the carrier 40 to travel on the way to the first sending device 20. The meshing transmission by the tracking conveyance belt 52 causes the carrier 40 to travel on the downstream side from the first sending device 20.

The swivel paths 11A and 12A, and the branch portion 14 will be described in detail. The swivel path 12A has the same configuration as the swivel path 11A, and thus will not be described.

Figure 7:
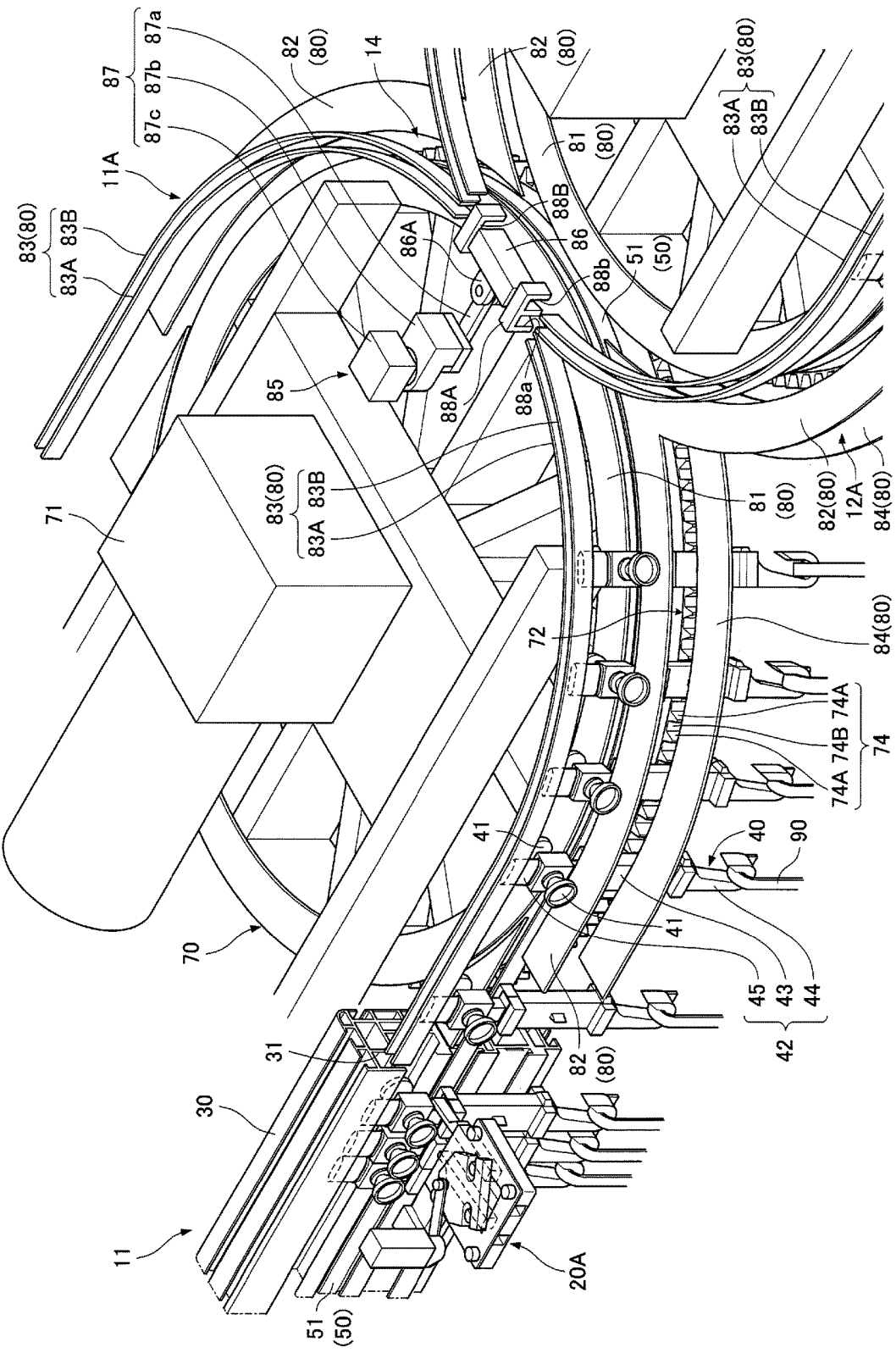
FIG. 7 is a perspective view in the vicinity of a cross joint branch portion of the same conveyance facility.

As shown in FIGS. 1 and 7, the swivel path 11A is formed as the curve section (a curved section of the conveyance path) extended from the traveling rail 30 forming a straight section of the first path 11. Similarly, the swivel path 12A is formed as the curve section extended from the traveling rail 30 forming a straight section of the second path 12.

The multiple carriers 40 are sent out at the predetermined intervals from a second sending device 20A provided on the upstream side. The multiple carriers 40 then travel on the swivel path 11A. The second sending device 20A has the same configuration as the first sending device 20, and thus will not be described. The traveling direction of the carriers 40 traveling on the swivel path 11A is changed (reversed) through the travel on the swivel path 11A.

As shown in FIG. 7, at each of the curve section forming the swivel path 11A and the curve section forming the swivel path 12A, a pulley 70 (an example of "rotating body") rotatable along the curve section, and a guide rail 80 guiding the carriers 40 so as to be travelable along the curve section are provided. The pulley 70 and the guide rail 80 of the swivel path 12A have the same configurations as the pulley 70 and the guide rail 80 of the swivel path 11A. The pulley 70 and the guide rail 80 of the swivel path 11A will thus be described below.

Figure 8:
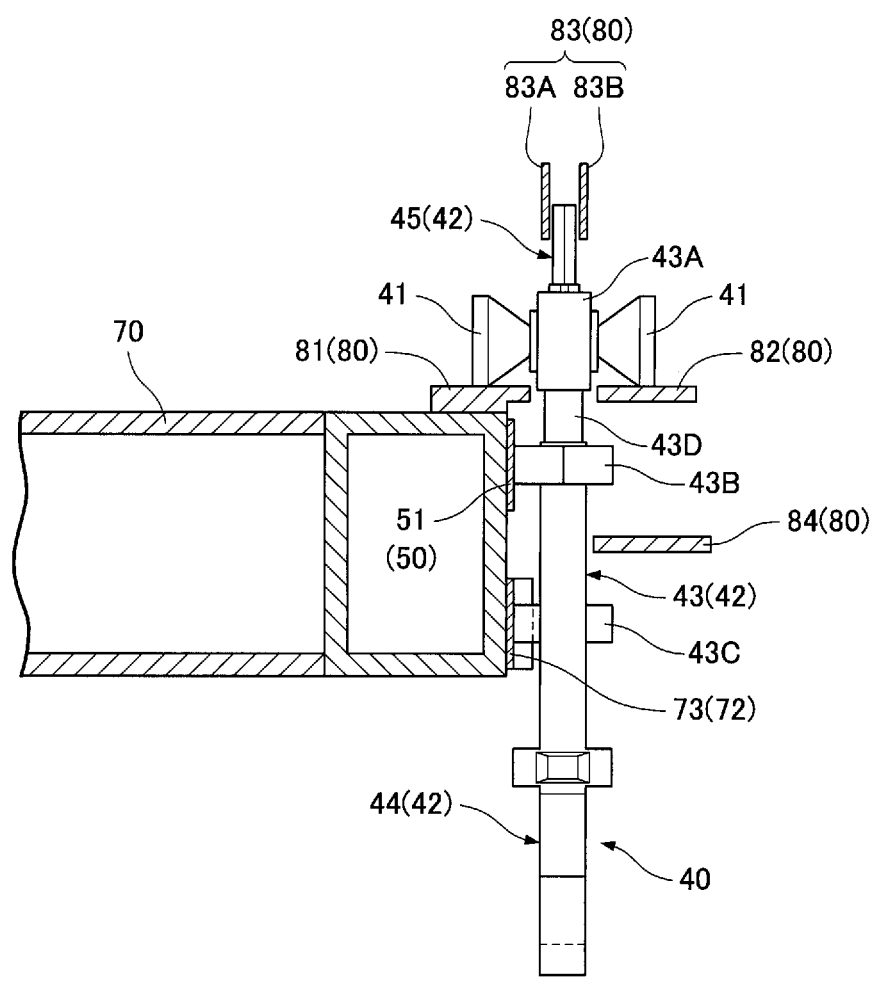
FIG. 8 is a schematic plan and cross-sectional view showing the carrier and a pulley of the same conveyance facility when the carrier is conveyed by the pulley.

The pulley 70 is the rotating body with an outer diameter of a length similar to an interval between two traveling rails 30 forming parallel straight sections of the first path 11. A motor 71 is provided above the pulley 70. The pulley 70 is driven by the motor 71 so as to rotate. The pulley 70 inherits the carrier 40 conveyed from the first path 11, from the traveling rail 30. The pulley 70 rotates in frictional contact with the inherited carrier 40 to thereby convey the carrier 40 and reverse the traveling direction of the carrier 40. As shown in FIGS. 7 and 8, the accumulation belt 50 (an example of "frictional contact portion") and a meshing transmission belt 72 (an example of "meshing contact portion") are provided along an outer peripheral side surface of the pulley 70.

The accumulation belt 50 is wound on a portion of an outer peripheral surface of the pulley 70. The accumulation belt 50 moves along the outer peripheral surface of the pulley 70, with the rotation of the pulley 70. The accumulation belt 50 puts the belt 51 into contact with the contact portion 43B of the carrier 40. The accumulation belt 50 causes the belt 51 in contact with the contact portion 43B to move along the outer peripheral surface of the pulley 70. Thereby, the carrier 40 travels.

The meshing transmission belt 72 is a circular belt for causing the carrier 40 to travel through the meshing transmission. The meshing transmission belt 72 is wound along the outer peripheral surface of the pulley 70 so as to be firmly fixed thereon. The meshing transmission belt 72 causes the meshing portion 43C of the body portion 43 of the carrier 40 to be meshed with a belt 73. In the meshing transmission belt 72, the belt 73 meshed with the meshing portion 43C rotates with the pulley 70. Thereby, the carrier 40 travels. In the meshing transmission belt 72, multiple concave portions 74 are formed on the belt 73 so as to be meshed with the meshing portion 43C of the carrier 40. As shown in FIG. 7, each of the concave portions 74 consists of two peak portions 74A, and a valley portion 74B linking adjacent peak portions 74A together. For the concave portions 74, the peak portions 74A and the valley portions 74B are alternately and continuously formed along a moving direction of the meshing transmission belt 72. The meshing portion 43C of the body portion 43 of the carrier 40 is meshed between the two peak portions 74A (with the valley portion 74B) of the concave portion 74. The meshing transmission belt 72 is thereby put into meshed contact with the carrier 40. In other words, the meshing portion 43C of one carrier 40 is meshed with one concave portion. Thereby, the carrier 40 becomes held by the meshing transmission belt 72. When the belt 73 moves, the movement of the carrier 40 is controlled by an interval between the two peak portions 74A (a width of the valley portion 74B) of the concave portion 74.

The accumulation belt 50 and the meshing transmission belt 72 are arranged at different positions of the pulley 70. Specifically, the meshing transmission belt 72 is arranged lower than a position where the accumulation belt 50 is provided on the pulley 70. In other words, the accumulation belt 50 is arranged so as to be frictionally contactable with the carrier 40 on the side near the traveling wheel 41 (at the contact portion 43B) in the body portion 43 of the carrier 40. The meshing transmission belt 72 is arranged to be able to be meshed with the carrier 40 on the side far from the traveling wheel 41 (at the meshing portion 43C) in the body portion 43 of the carrier 40. In such a positional relationship, the accumulation belt 50 or the meshing transmission belt 72 is put into contact with the carrier 40. Thereby, the carrier 40 can travel at the stable position without jounce in the conveyance in contact with the respective belts.

As shown in FIGS. 7 and 8, the guide rail 80 includes a rotation guide rail 81 (an example of "traveling-body guide rail") guiding one traveling wheel 41 (the traveling wheel 41 traveling on an inner peripheral side, with respect to the traveling direction of the carrier 40) of a pair of the traveling wheels 41 forming the carrier 40; a fixed guide rail 82 (an example of "traveling-body guide rail") guiding the other traveling wheel 41 (the traveling wheel 41 traveling on an outer peripheral side, with respect to the traveling direction of the carrier 40) of the pair of the traveling wheels 41; an upper guide rail 83 (an example of "support guide rail") guiding the head portion 45 of the support 42 forming the carrier 40; and a side guide rail 84 (an example of "support guide rail") guiding the body portion 43 of the support 42 forming the carrier 40.

The rotation guide rail 81 is provided at an outer peripheral edge portion of an upper portion of the pulley 70. The rotation guide rail 81 rotates with the pulley 70. The rotation guide rail 81 is formed with a circular flat plate. A planar portion of the rotation guide rail 81 is arranged in a substantially horizontal direction so that the traveling wheel 41 can be placed thereon.

The fixed guide rail 82 is provided along the outer peripheral side of the rotation guide rail 81. The fixed guide rail 82 is fixed to a not-shown facility enclosure. The fixed guide rail 82 is formed with a curved plate material. A planar portion of the fixed guide rail 82 is arranged in the substantially horizontal direction so that the traveling wheel 41 can be placed thereon. The provision of the fixed guide rail 82 can prevent the carrier 40 traveling on the swivel path 11A from tilting to an outer peripheral side of the swivel path 11A.

The rotation guide rail 81 and the fixed guide rail 82 are arranged parallel to each other in a right-left direction with respect to the traveling direction of the carrier 40, so as to hold the body portion 43 of the carrier 40 therebetween.

The upper guide rail 83 is provided above the rotation guide rail 81 and the fixed guide rail 82. The upper guide rail 83 is fixed to the not-shown facility enclosure. The upper guide rail 83 includes an inner peripheral side guide portion 83A and an outer peripheral side guide portion 83B. The inner peripheral side guide portion 83A and the outer peripheral side guide portion 83B are formed with curved plate materials. The inner peripheral side guide portion 83A and the outer peripheral side guide portion 83B are caused to stand in the vertical direction. In the upper guide rail 83, the inner peripheral side guide portion 83A and the outer peripheral side guide portion 83B are arranged to face each other so as to keep an interval where the head portion 45 of the carrier 40 can travel. In the upper guide rail 83, each of a beginning portion and an ending portion is arranged so as to be continuous with the guide groove 31 of the traveling rail 30 forming the first path 11. A central portion of the upper guide rail 83 is split. A cross branch switch 85 to be described is arranged at a space formed by the split of the upper guide rail 83. In the upper guide rail 83, end portions of split portions are arranged so as to be continuous with a movable guide block 86 and lead-in guide blocks 88A and 88B of the cross branch switch 85.

The side guide rail 84 is provided so as to face the fixed guide rail 82, below the rotation guide rail 81 and the fixed guide rail 82. The side guide rail 84 is fixed to the not-shown facility enclosure. The side guide rail 84 is formed with a curved flat plate. A planar portion of the side guide rail 84 is arranged in the substantially horizontal direction so that an end surface of an inner diameter side can abut the side surface of the body portion 43 of the support 42. The side guide rail 84 guides the side surface of the body portion 43 on the outer peripheral side of the carrier 40 traveling on the swivel path 11A. The side guide rail 84 guides the side surface of the body portion 43. The carrier 40 traveling on the swivel path 11A is thereby prevented from floating to the outer peripheral side. In other words, the side guide rail 84 has a function of holding the carrier 40 traveling on the swivel path 11A, onto an inner peripheral side of the swivel path 11A. The provision of the side guide rail 84 can prevent the meshing portion 43C of the body portion 43 of the carrier 40 traveling on the swivel path 11A, from deviation from the meshing transmission belt 72.

Figure 9A:
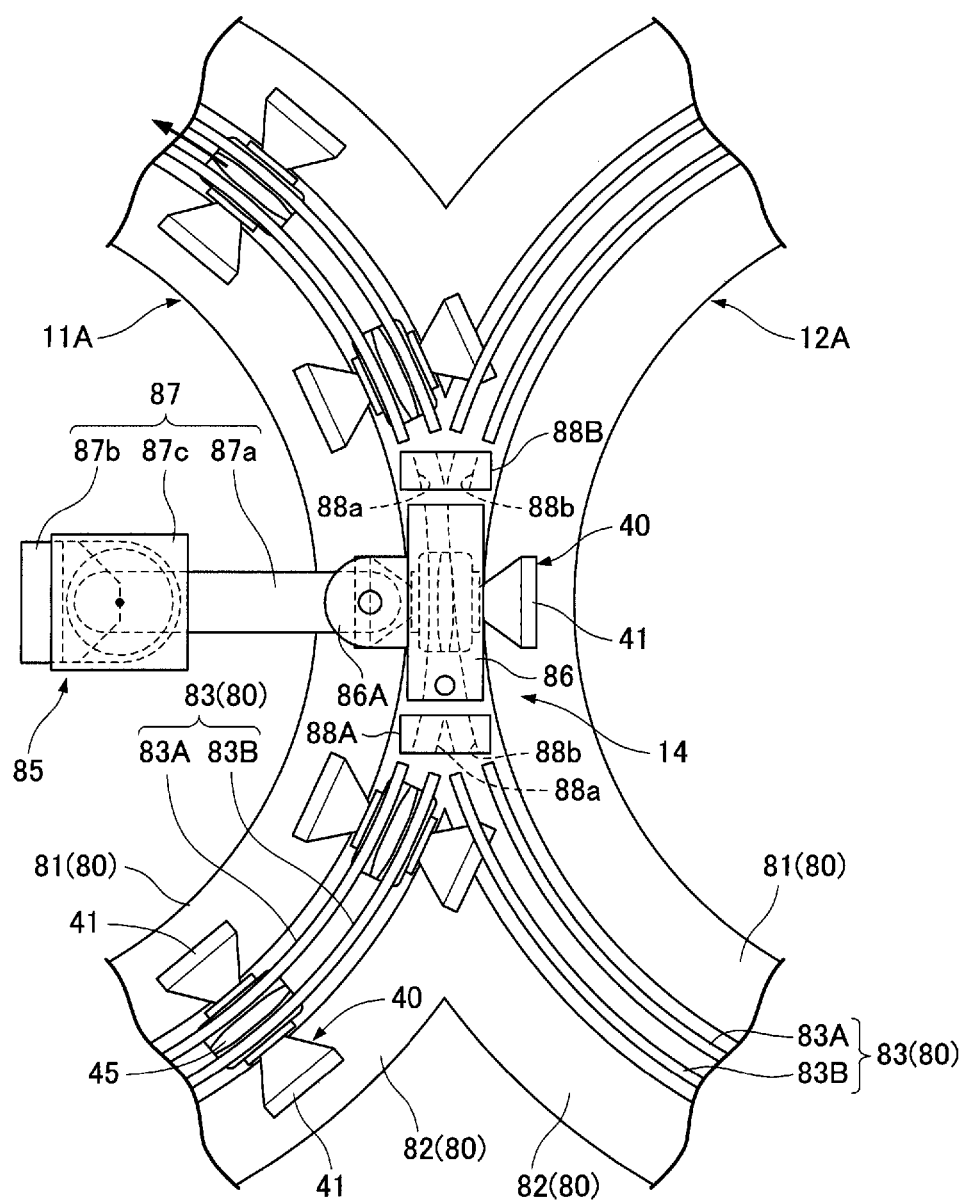
FIG. 9A is a plan view showing operations of a cross branch switch of the same conveyance facility in a case where a conveyance path of the carrier is a first circulation path.
Figure 9B:
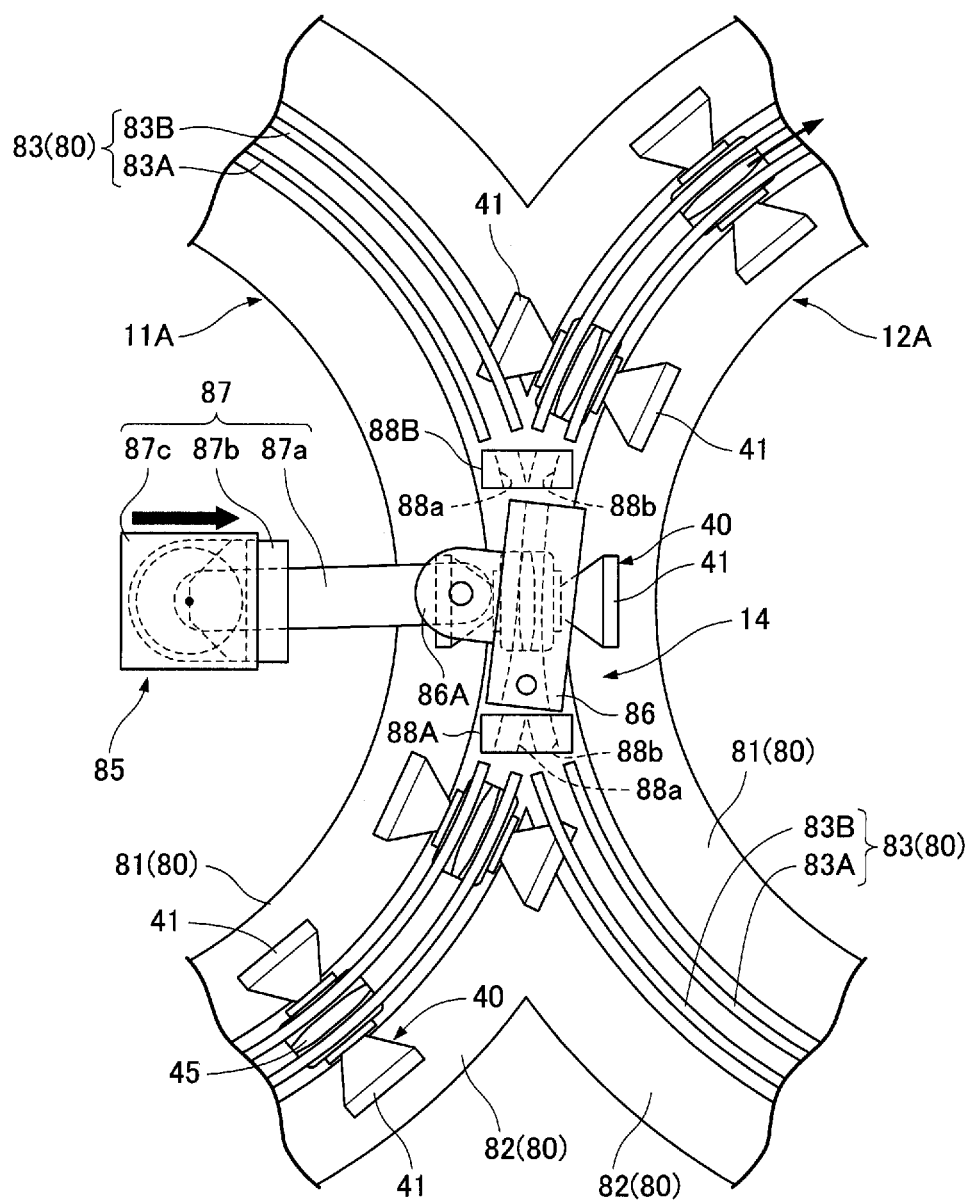
FIG. 9B is a plan view showing the operations of the cross branch switch of the same conveyance facility in a case where the conveyance path of the carrier is changed from the first circulation path to a second circulation path.

As shown in FIGS. 7, 9A and 9B, the branch portion 14 is provided at an overlapping position of the swivel path 11A and the swivel path 12A. In the branch portion 14, the carrier 40 conveyed from the first path 11 continuously travels on the swivel path 11A so as to be conveyed to the first path 11. Alternatively, the conveyance path of the carrier 40 conveyed from the first path 11 is switched from the swivel path 11A to the swivel path 12A, so that the carrier 40 is conveyed to the second path 12. Similarly, the carrier 40 conveyed from the second path 12 continuously travels on the swivel path 12A so as to be conveyed to the second path 12. Alternatively, the conveyance path of the carrier 40 conveyed from the second path 12 is switched from the swivel path 12A to the swivel path 11A, so that the carrier 40 is conveyed to the first path 11. In the branch portion 14, such switching of the conveyance path of the carrier 40 is performed by the cross branch switch 85 (an example of "switching device").

The cross branch switch 85 mainly includes the movable guide block 86 guiding the head portion 45 of the carrier 40, and a towing device 87 towing the movable guide block 86.

The movable guide block 86 is composed of a lengthy concave member. In the movable guide block 86, a concave guide portion guiding the head portion 45 of the carrier 40 is arranged downward. The movable guide block 86 guides the carrier 40 at the concave guide portion so that the head portion 45 of the carrier 40 is covered from above. In other words, in the movable guide block 86, the concave guide portion is formed with a concave depth depending on the head portion 45 of the carrier 40. A width of the concave guide portion of the movable guide block 86 gradually narrows from an inlet side toward an outlet side. One end portion (end portion on the inlet side) of the movable guide block 86 is supported turnably with respect to the not-shown facility enclosure. The movable guide block 86 has a connecting portion 86A for connecting with an arm portion 87a of the towing device 87, on one side portion of the movable guide block 86.

The towing device 87 mainly includes the arm portion 87a towing the movable guide block 86; a cam portion 87b driving the arm portion 87a; and a motor 87c driving the cam portion 87b.

The arm portion 87a can move in the horizontal direction through cam drive by the motor 87c. One end portion of the arm portion 87a is connected to the cam portion 87b. The other end portion of the arm portion 87a is turnably connected to the connecting portion 86A of the movable guide block 86.

The cam portion 87b can be driven by the motor 87c so as to turn. The cam portion 87b turns with the motor 87c to move the arm portion 87a in the horizontal direction.

The motor 87c is supported by the not-shown facility enclosure. The motor 87c turnably supports the cam portion 87b.

The inlet side lead-in guide block 88A is provided on the inlet side of the movable guide block 86. The head portion 45 of the carrier 40 is guided by the upper guide rail 83 of the swivel path 11A or the swivel path 12A. The inlet side lead-in guide block 88A is a guide block guiding the head portion 45 of the carrier 40 to the movable guide block 86.

The outlet side lead-in guide block 88B is provided on the outlet side of the movable guide block 86. The outlet side lead-in guide block 88B is a guide block guiding the head portion 45 of the carrier 40 guided by the movable guide block 86, to the upper guide rail 83 of the swivel path 11A or the swivel path 12A.

Guide portions 88a and 88b are formed in each of the lead-in guide blocks 88A and 88B. The guide portions 88a and 88b guide the head portion 45 of the carrier 40. The guide portions 88a and 88b are shaped with groove portions made of concave members placed downward. Each of the lead-in guide blocks 88A and 88B covers the head portion 45 of the carrier 40 from above, at either one guide portion of the two concave guide portions 88a and 88b. The lead-in guide blocks 88A and 88B thereby guide the carrier 40. In other words, in the lead-in guide blocks 88A and 88B, the concave guide portions 88a and 88b are formed with the concave depth depending on the head portion 45 of the carrier 40.

In the inlet side lead-in guide block 88A, a beginning portion of the first guide portion 88a is arranged so as to be continuous with the upper guide rail 83 of the swivel path 11A. In the inlet side lead-in guide block 88A, a beginning portion of the second guide portion 88b is arranged so as to be continuous with the upper guide rail 83 of the swivel path 12A.

In the outlet side lead-in guide block 88B, an ending portion of the first guide portion 88a is arranged so as to be continuous with the upper guide rail 83 of the swivel path 11A. In the outlet side lead-in guide block 88B, an ending portion of the second guide portion 88b is arranged so as to be continuous with the upper guide rail 83 of the swivel path 12A.

The lead-in guide blocks 88A and 88B are fixed to the not-shown facility enclosure.

The travel of the carrier 40 on the swivel path 11A will be described.

As shown in FIG. 7, the carrier 40 travels on the first path 11 through the friction transmission by the accumulation belt 50. The carrier 40 is then sent out by the second sending device 20A at the predetermined intervals. The carrier 40 thereby travels toward the swivel path 11A while keeping the predetermined intervals between the adjacent carriers 40.

When the carrier 40 is sent out by the second sending device 20A at the predetermined intervals, the head portion 45 of the support 42 of the carrier 40 is guided by the upper guide rail 83. The carrier 40 also travels to an inlet portion of the swivel path 11A through the friction transmission by the accumulation belt 50. In other words, in the carrier 40, the contact portion 43B of the support 42 is in frictional contact with the accumulation belt 50. The head portion 45 of the support 42 is supported by the upper guide rail 83.

In the carrier 40, one traveling wheel 41 (the traveling wheel 41 traveling on the inner peripheral side, with respect to the traveling direction of the carrier 40) of a pair of the traveling wheels 41 is guided by the rotation guide rail 81. The other traveling wheel 41 (the traveling wheel 41 traveling on the outer peripheral side, with respect to the traveling direction of the carrier 40) of the pair of the traveling wheels 41 is guided by the fixed guide rail 82. In other words, in the carrier 40, the contact portion 43B of the support 42 is in frictional contact with the accumulation belt 50. The pair of traveling wheels 41 is placed on and supported by the guide rail 80 (the rotation guide rail 81 and the fixed guide rail 82).

In the carrier 40, the meshing portion 43C of the body portion 43 is meshed with the meshing transmission belt 72 rotating with the rotation of the pulley 70. The carrier 40 is thereby supported by the guide rail 80, and is in contact with the accumulation belt 50 and the meshing transmission belt 72. The carrier 40 then travels on the swivel path 11A according to the rotation of the pulley 70. In this way, the carrier 40 travels on the swivel path 11A with conveyance power of the accumulation belt 50 and the meshing transmission belt 72.

Operations of the cross branch switch 85 will be described.

As shown in FIGS. 9A and 9B, the cross branch switch 85 switches a guide direction of the support 42 with the movable guide block 86, and thereby switches a conveyance direction of the carrier 40.

As shown in FIG. 9A, if the carrier 40 is conveyed along the swivel path 11A, the cross branch switch 85 holds the movable guide block 86 so that the concave guide portion of the movable guide block 86, the guide portions 88a and 88b of the inlet side lead-in guide block 88A, and the first guide portion 88a of the outlet side lead-in guide block 88B communicate with one another. Thereby, the head portion 45 of the support 42 of the carrier 40 guided along the upper guide rail 83 from the upstream side of the swivel path 11A is guided along the first guide portion 88a of the inlet side lead-in guide block 88A. The head portion 45 of the support 42 of the carrier 40 is further guided to the concave guide portion of the movable guide block 86 communicating with the first guide portion 88a of the inlet side lead-in guide block 88A. Subsequently, the head portion 45 of the support 42 of the carrier 40 is guided along the first guide portion 88a of the outlet side lead-in guide block 88B. The head portion 45 of the support 42 of the carrier 40 is thereby continuously guided to the upper guide rail 83 of the swivel path 11A on the downstream side.

As shown in FIG. 9B, if the conveyance path of the carrier 40 is switched from the swivel path 11A to the swivel path 12A, the cross branch switch 85 causes the arm portion 87a of the towing device 87 to move in the horizontal direction. The cross branch switch 85 thereby tows the movable guide block 86 in a direction orthogonal to the horizontal direction. Thereby, the other end portion (end portion on the outlet side) of the movable guide block 86 turns toward the upper guide rail 83 of the swivel path 12A on the downstream side. Then, the concave guide portion of the movable guide block 86, the guide portions 88a and 88b of the inlet side lead-in guide block 88A, and the second guide portion 88b of the outlet side lead-in guide block 88B communicate with one another. The head portion 45 of the support 42 of the carrier 40 guided along the upper guide rail 83 from the upstream side of the swivel path 11A is guided along the first guide portion 88a of the inlet side lead-in guide block 88A. The head portion 45 of the support 42 of the carrier 40 is further guided to the concave guide portion of the movable guide block 86 communicating with the first guide portion 88a of the inlet side lead-in guide block 88A. Subsequently, the head portion 45 of the support 42 of the carrier 40 is guided along the second guide portion 88b of the outlet side lead-in guide block 88B. The head portion 45 of the support 42 of the carrier 40 is thereby directed to the upper guide rail 83 of the swivel path 12A on the downstream side.

As has been described, according to the present embodiment, the carrier 40 is caused to travel on the swivel paths 11A and 12A (curve sections) with the both traveling wheels 41 being guided by the guide rail 80. The carrier 40 thus does not need to separately include an engaging portion for the pulley 70. The configuration of the carrier 40 can thus be simplified.

According to the present embodiment, when the carrier 40 transfers the traveling section from the straight section of the first path 11 (second path 12) to the curve section of the swivel path 11A (swivel path 12A), the carrier 40 itself does not need to be synchronized to the rotation of the pulley 70. The conveyance of the carrier 40 can thus be easily controlled. In addition, strict adjustment of an installation height of the pulley 70 is not required in accordance with the position of the traveling rails 30 (height of the conveyed carrier 40). Installation of the pulley 70 can thus be simplified.

According to the present embodiment, when the carrier 40 transfers the traveling section from the straight section of the first path 11 (second path 12) to the curve section of the swivel path 11A (swivel path 12A), or when the carrier 40 transfers the traveling section from the curve section of the swivel path 11A (swivel path 12A) to the curve section of the swivel path 12A (swivel path 11A), the support 42 of the carrier 40 does not engage (mate) with the pulley 70 itself. Generation of friction between the support 42 of the carrier 40 and the pulley 70 can thus be prevented.

According to the present embodiment, the carrier 40 is caused to travel on the swivel paths 11A and 12A (curve sections) with the both traveling wheels 41 being guided by the guide rail 80. The carrier 40 can thus be prevented from dropout from the guide rail 80 due to swing of the conveyed bag 90 or the like.

According to the present embodiment, the carrier 40 meshed with the meshing transmission belt 72 travels on the swivel path 11A. The multiple carriers 40 can thus be caused to travel along the swivel path 11A (curve section) while the predetermined intervals are kept. If the carrier 40 is conveyed only through the friction transmission by the accumulation belt 50, the carrier 40 may be misaligned with the accumulation belt 50 during the conveyance of the carrier 40. Accordingly, conveyance pitch of the carrier 40 needs to be increased when the carrier 40 is caused to travel on the swivel paths 11A and 12A. If the meshing transmission by the meshing transmission belt 72 is also employed, however, such misalignment does not occur. The conveyance pitch of the carrier 40 can thus be reduced when the carrier 40 is caused to travel on the swivel paths 11A and 12A. Consequently, capability of the conveyance of the carrier 40 in the conveyance facility 10 can be improved.

According to the present embodiment, the meshed contact with the carrier 40 is performed lower than the frictional contact with the carrier 40. The carrier 40 can thus be caused to stably travel on the swivel paths 11A and 12A (curve sections).

According to the present embodiment, when the conveyance path of the carrier 40 is switched, the guide for a pair of the traveling wheels 41 is mutually switched between the rotation guide rail 81 and the fixed guide rail 82. Thus, when the conveyance path is switched, the carrier 40 can be prevented from the dropout from the guide rail 80 due to the swing of the conveyed bag 90 or the like.

In the present embodiment, the article conveyed in the conveyance facility 10 is the bag 90. The article is, however, not limited thereto, and may be any article capable of being suspended by the carrier 40.

In the present embodiment, the meshing portion 43C of the carrier 40 is composed of the flat plate-like convex member. The meshing portion 43C is, however, not limited thereto, and may be composed of a concave member, for example, as long as the meshing between the tracking conveyance belt 52 and the meshing transmission belt 72 is possible. In this case, the peak portion 54A of the concave portion 54 of the tracking conveyance belt 52, and the peak portion 74A of the concave portion 74 of the meshing transmission belt 72 are meshed with the concave member of the meshing portion 43C.

In the present embodiment, one meshing portion 43C is provided on the body portion 43 of the carrier 40. The meshing portion 43C is, however, not limited thereto. Multiple meshing portions 43C may be provided on the body portion 43, as long as the meshing between the tracking conveyance belt 52 and the meshing transmission belt 72 is possible.

In the present embodiment, the movable guide block 86 is towed by the towing device 87 so as to switch the guide direction of the support 42 by the movable guide block 86. This configuration is, however, not limited thereto. As long as the movable guide block 86 is turnable in a predetermined direction, for example, a turning shaft turnably supporting the movable guide block 86 may be directly turned by a drive source such as a motor.

Figure 10:
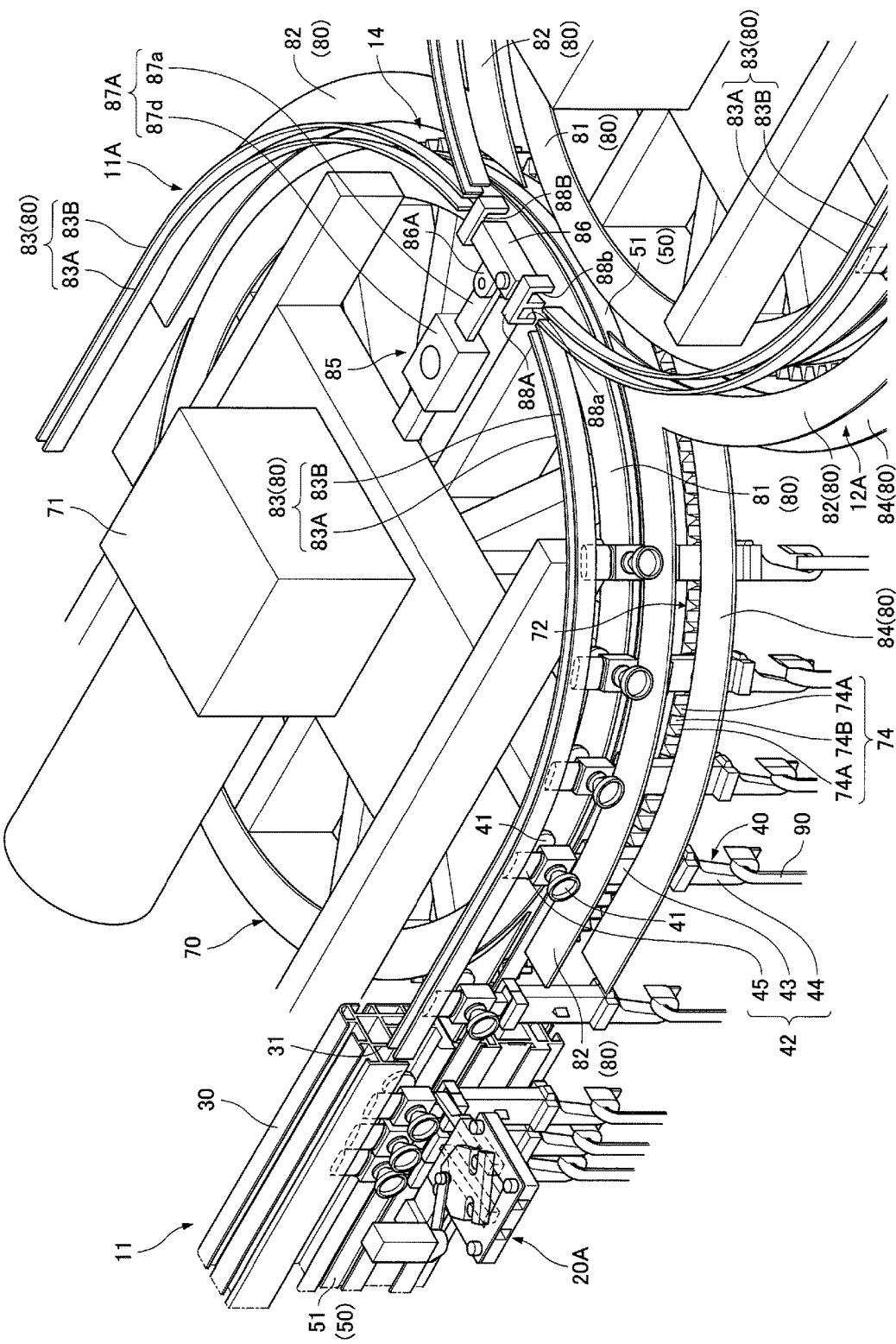
FIG. 10 is a perspective view in the vicinity of a cross joint branch portion according to another example of the same conveyance facility.
Figure 11A:
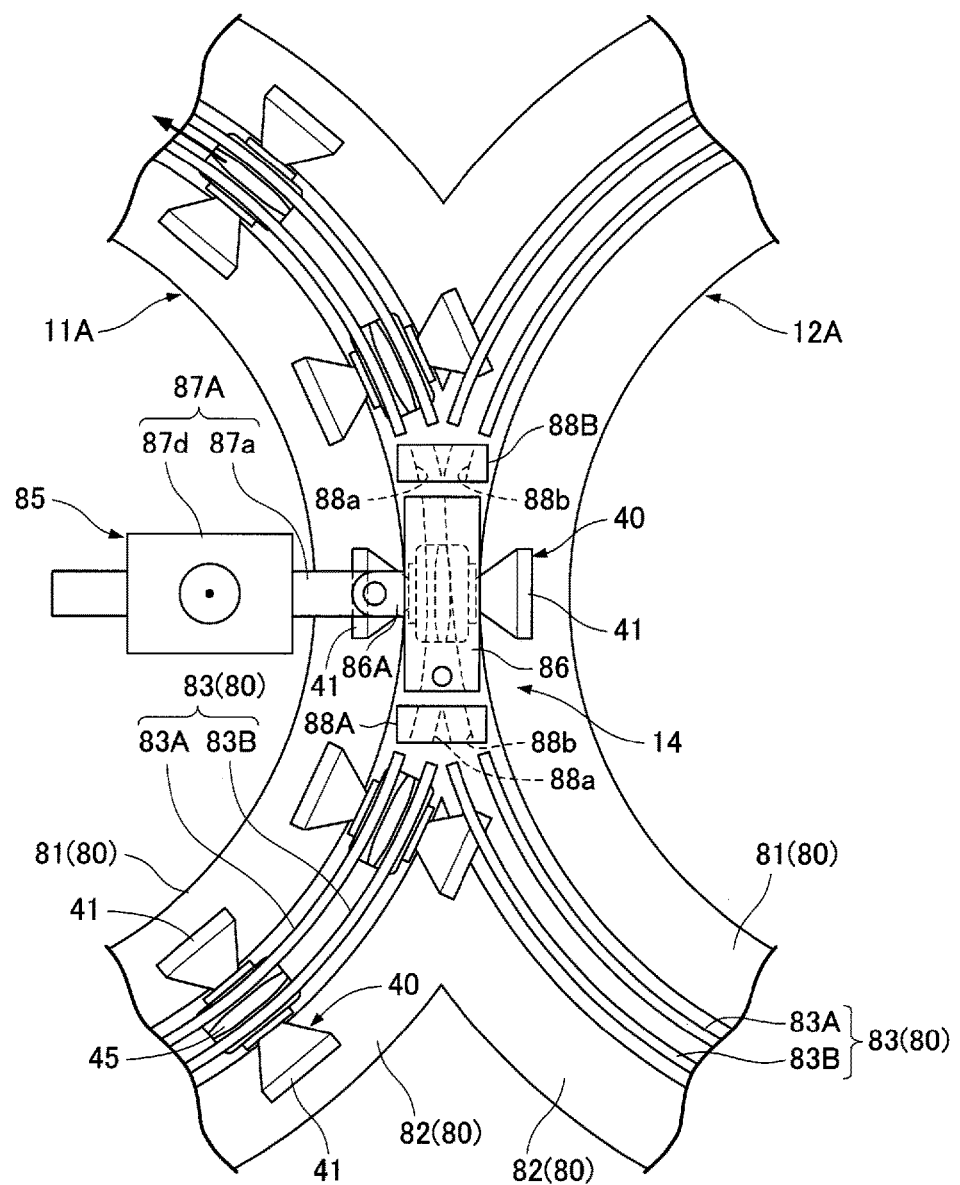
FIG. 11A is a plan view showing operations of a cross branch switch according to the other example of the same conveyance facility in a case where a conveyance path of a carrier is a first circulation path.

In the present invention, as shown in FIGS. 10, 11A, and 11B, an electric actuator 87A may mainly include the arm portion 87a towing the movable guide block 86; and a main body portion 87d causing the arm portion 87a to perform expansion and contraction movement. The electric actuator 87A may be employed as the towing device 87 in the cross branch switch 85. The arm portion 87a can perform the expansion and contraction movement in the horizontal direction with respect to the main body portion 87d. A tip end of the arm portion 87a is turnably connected to the connecting portion 86A of the movable guide block 86. The main body portion 87d is supported turnably with respect to the not-shown facility enclosure, and movably supports the arm portion 87a. The main body portion 87d includes a not-shown motor for moving the arm portion 87a. The motor is driven to cause the arm portion 87a to perform the expansion and contraction movement.

What is claimed is:
1. A conveyance facility for conveying an article along a conveyance path, comprising:
a conveyance unit comprising a pair of traveling bodies traveling on the conveyance path, and a support trav- eling with the pair of traveling bodies and supporting the article being suspended, the conveyance unit conveying the article along the conveyance path,
wherein the conveyance path includes a straight section, and a curve section extended from the straight section,
wherein the curve section comprises:
  a rotating body rotatable along the curve section and in frictional contact with the support;
  a traveling-body guide rail guiding the pair of traveling bodies so as to be travelable along the curve section; and
  a support guide rail guiding the support along the curve section, and
wherein the traveling-body guide rail comprises:
  a rotation guide rail guiding one traveling body of the pair of traveling bodies, and rotating with the rotating body; and
  a fixed guide rail guiding another traveling body of the pair of traveling bodies, and being provided along the rotation guide rail.

2. The conveyance facility according to claim 1, wherein the support guide rail comprises:
  an upper guide rail guiding a head portion of the support; and
  a side guide rail guiding a body portion of the support.

3. The conveyance facility according to claim 1, wherein the rotating body includes a meshing contact portion being meshed with the support.

4. The conveyance facility according to claim 1, wherein the rotating body includes:
  a frictional contact portion coming into frictional contact with the support; and
  a meshing contact portion being meshed with the support, and
wherein the meshing contact portion is provided lower than a position where the frictional contact portion is provided in the rotating body.

5. The conveyance facility according to claim 1, wherein the conveyance path includes a first conveyance path including the curve section, and a second conveyance path provided independently from the first conveyance path and including the curve section;
wherein the conveyance facility comprises a switching device capable of switching the conveyance path of the conveyance unit traveling on the curve section of the first conveyance path, to the curve section of the second conveyance path, and capable of switching the conveyance path of the conveyance unit traveling on the curve section of the second conveyance path, to the curve section of the first conveyance path; and
wherein when the switching device switches the conveyance path of the conveyance unit, the switching device switches the guide for the traveling body guided by the rotation guide rail, to the guide by the fixed guide rail, and switches the guide for the traveling body guided by the fixed guide rail, to the guide by the rotation guide rail.

* * * * *